Feb. 14, 1950 B. C. COONS 2,497,586
CONTAINER FEED AND CONTROL MECHANISM
Original Filed July 24, 1942 4 Sheets-Sheet 2
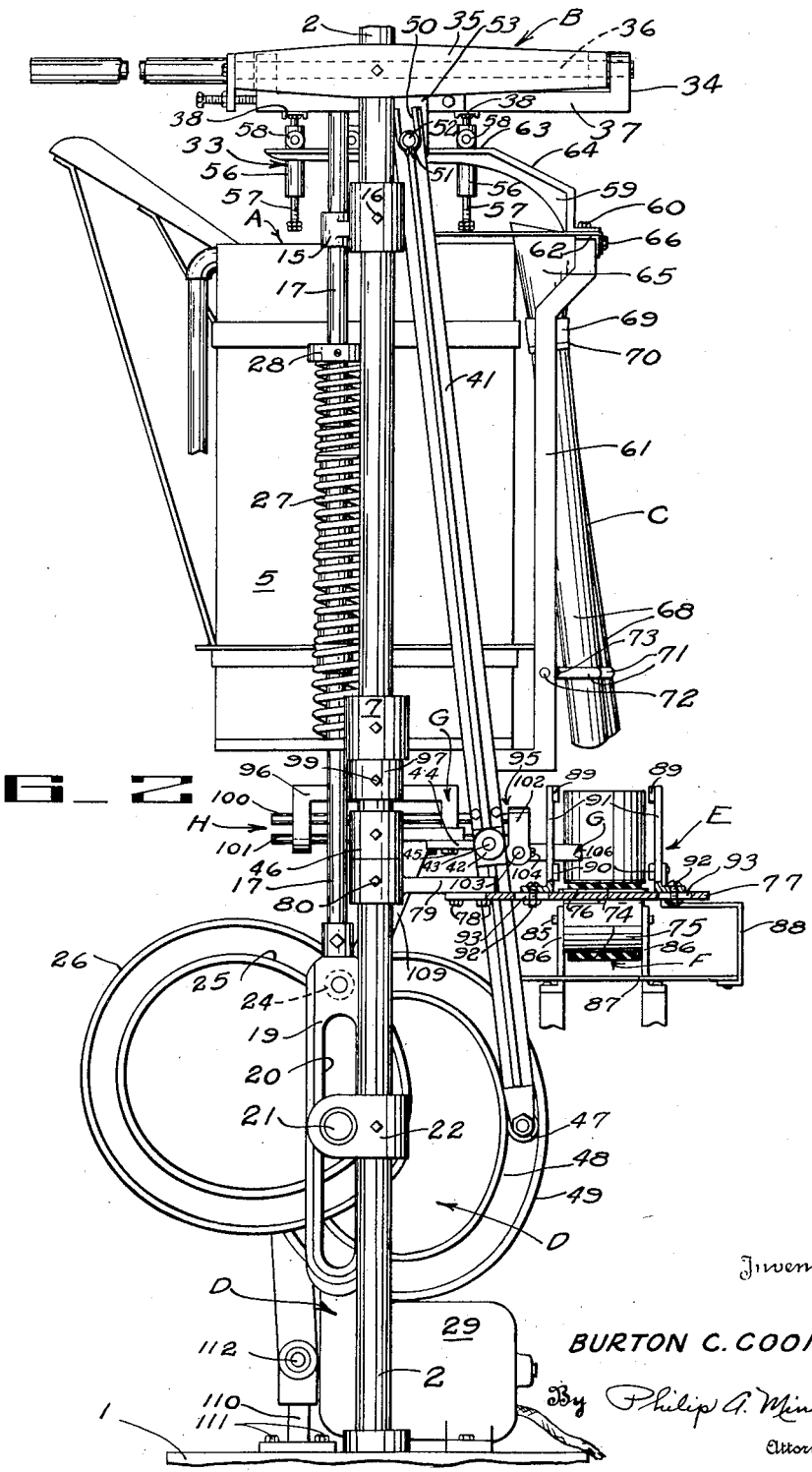
FIG_2
Inventor
BURTON C. COONS
By Philip G. Minnis
Attorney Feb. 14, 1950     B. C. COONS     2,497,586
CONTAINER FEED AND CONTROL MECHANISM Original Filed July 24, 1942     4 Sheets-Sheet 3

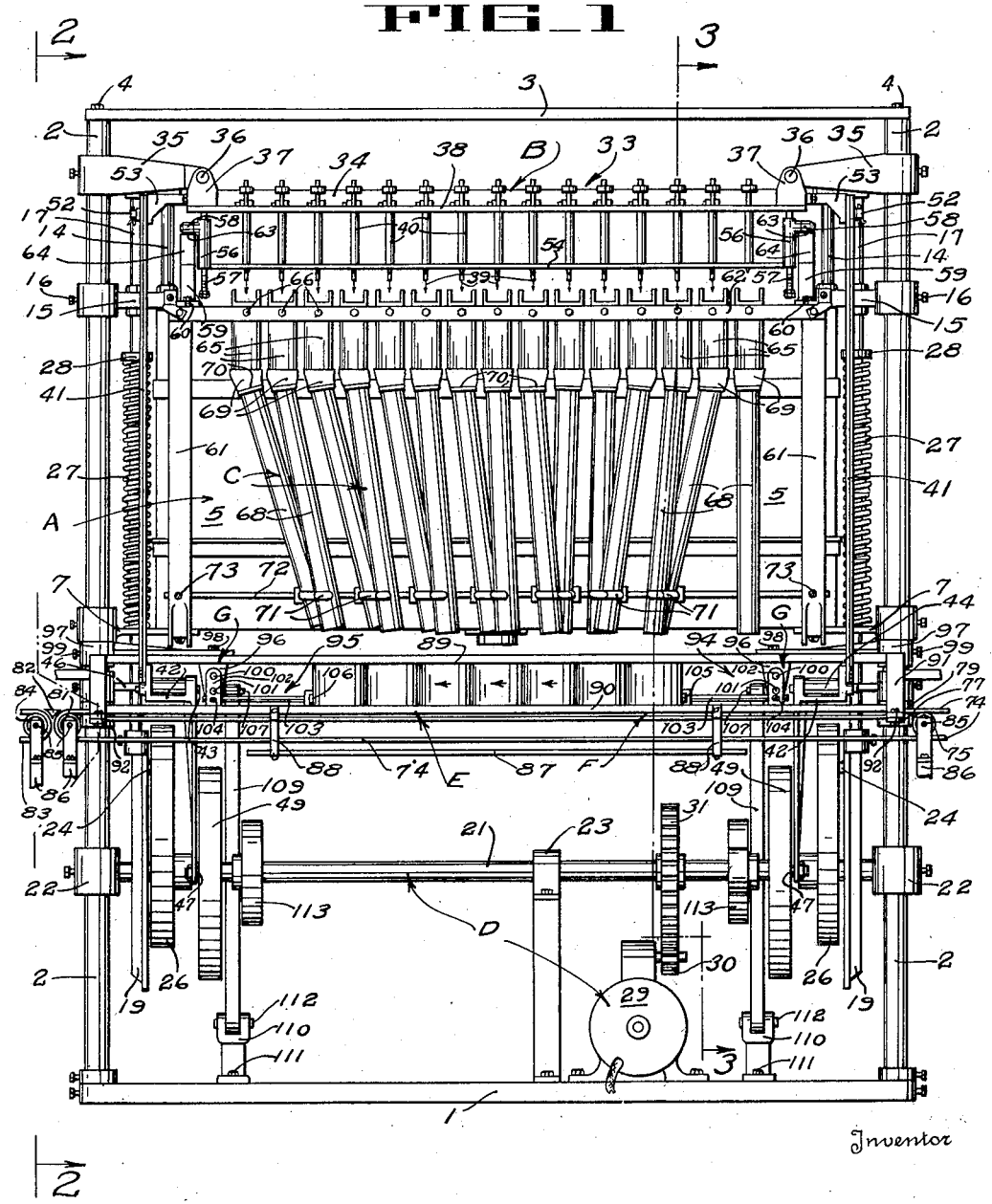

FIG_3

Inventor
BURTON C. COONS
By Philip A. Minnis.
Attorney

Feb. 14, 1950         B. C. COONS        2,497,586
CONTAINER FEED AND CONTROL MECHANISM
Original Filed July 24, 1942                4 Sheets—Sheet 4
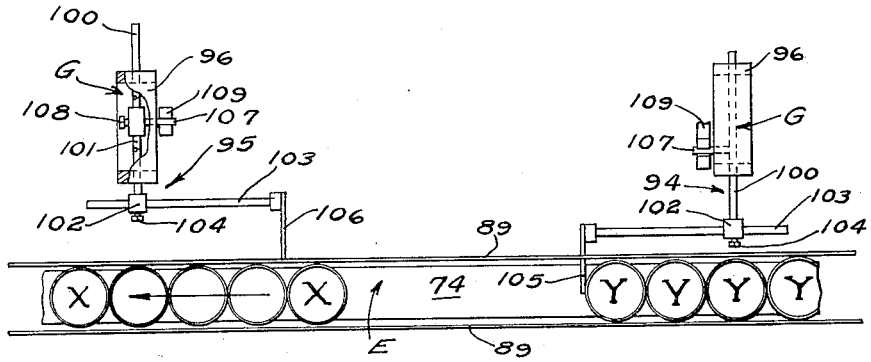
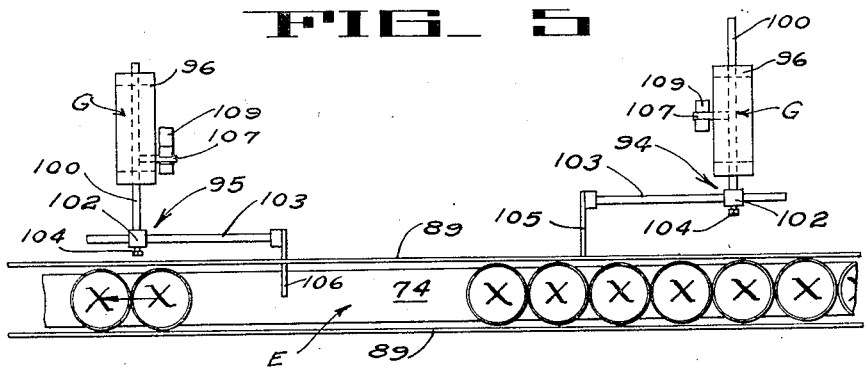
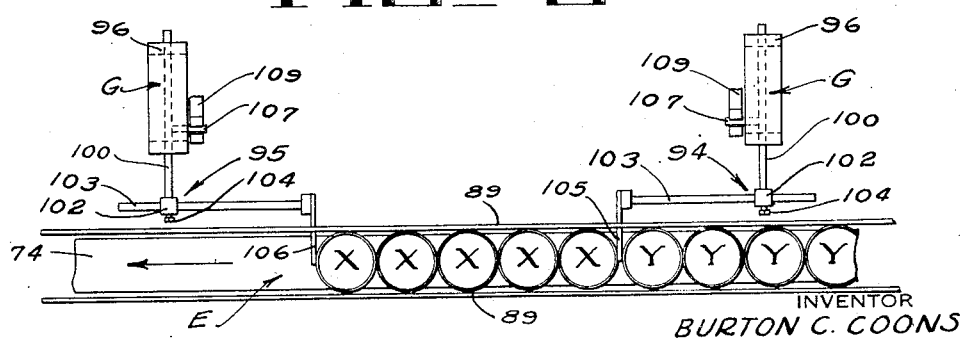
INVENTOR
BURTON C. COONS
BY Philip G. Minnis.
ATTORNEY Patented Feb. 14, 1950

2,497,586

UNITED STATES PATENT OFFICE 2,497,586

CONTAINER FEED AND CONTROL MECHANISM

Burton C. Coons, San Jose, Calif., assignor to Food Machinery and Chemical Corporation, a corporation of Delaware Original application July 24, 1942, Serial No. 452,194, now Patent No. 2,398,922, dated April 23, 1946. Divided and this application August 2, 1944, Serial No. 547,791

2 Claims. (Cl. 198—19)

This invention relates to container feeding mechanism and more particularly to a device for controlling the movement of containers relative to container filling mechanism.

This application is a division of my copending application Serial Number 452,194, filed July 24, 1942, and granted April 23, 1946, as Patent No. 2,398,922, for Method and apparatus for feeding fruits and vegetables.

The container feed mechanism of the present invention is shown associated with an article feeding apparatus of the type which intermittently feeds charges consisting of predetermined quantities of articles for reception by the containers. The article feeding apparatus shown is more particularly described and claimed in my above mentioned copending application and so far as the present invention is concerned serves merely to illustrate a form of feeding apparatus with which the present invention is especially adapted to be associated.

For convenience, the invention will be described with respect to an embodiment for feeding halved maraschino cherries to containers which have already received a proper proportion of fruit cocktail mix.

In the canning of fruit cocktail and mixed fruits, particular attention must be given to the number or count of fruit pieces added per container. This is especially true when there is a scarcity of the fruit or the fruit is costly or has a special decorative value in serving, as in the case of maraschino cherries. Short count brings complaints from the trade and over counting means a loss to the packer. It is also oftentimes desired to accurately proportion the contents of a container with different fruits or it may be essential to add a specific number of pieces of a certain fruit for flavoring or coloring.

In the foregoing circumstances, the practice heretofore has been to feed the fruit by hand, using a line of operators, each operator being expected to deposit fruit pieces in each container as it went by. By this practice it was thought that no container would be entirely missed and that the opportunity for error would be materially reduced.

When it is considered that it is desired to supply 150 cans per minute with a predetermined number, for example, 4 to 8 halves of maraschino cherries to each container, the extent of the labor problem will be evident it being appreciated that errors readily occur and moreover, the amount of floor space required to accomplish the same result by hand will increase the cost of canning.

In accordance with the present invention the foregoing objections and conditions relative to packaging articles are overcome and a reliable apparatus for regulating the feeding of containers has become possible.

In conjunction with the mechanism for feeding predetermined charges of articles it is an object of the present invention to provide a mechanism for positioning containers for reception of articles in timed relation with the discharge of the articles by the feeding mechanism.

Another object of this invention is to provide mechanism for feeding containers in a manner whereby one or more containers may be held at a delivery station a sufficient length of time to receive a predetermined quantity of articles.

Another object of the invention is to provide in an apparatus in which containers are continuously fed past a delivery station, a mechanism for controlling the movement of the containers to position one or more containers for the reception of articles incident to the discharge of articles at such delivery station.

Still another object of this invention is to provide in an apparatus for periodically directing a charge of articles to a point of use or delivery, a controlled container feed mechanism in which a constant flow of containers toward such point of use or delivery is momentarily retarded for the reception of charges of articles and in which subsequent containers, about to move into charge receiving position, are restrained against movement incident to the release of the containers which have already received a charge of articles.

Other objects and advantages of the present invention reside in the novel combination of elements and arrangement of parts to be hereinafter more fully described and claimed in the light of the drawings, in which:

Fig. 1 is an elevational view of the delivery end of the article feeding apparatus showing containers in position for receiving a charge of articles.

Fig. 2 is a side elevational view as seen from line 2—2 in Fig. 1.

Fig. 3 is a vertical sectional view taken along line 3—3 in Fig. 1; and

Figs. 4, 5 and 6 are schematic views of the container feed and stop mechanism; Fig. 4 showing the filled containers leaving charge receiving position; Fig. 5 a new group of containers entering charge receiving position; and Fig. 6 containers in charge receiving position.

Generally the article feeding apparatus includes a bin A for supporting a supply of articles, an article discharging mechanism B for conveying articles in charges of predetermined quantities to a point of discharge, a series of article directing means C for receiving the charges from the discharge mechanism, and a drive mechanism D for operating the discharge mechanism.

The container feed mechanism includes a container guide channel E for guiding containers in a path beneath the article directing means C, a continuously moving means F in the channel for moving containers along the latter, container engaging means G for momentarily retarding and releasing containers incident to the discharge of articles into and from the article directing means, and a control mechanism H coordinated with the drive mechanism D for operating the container engaging means G in synchronism with the intermittent discharge of articles by the article discharging mechanism.

More particularly the specific form of feeding mechanism shown is concerned with feeding an accurate and predetermined count of small fruit although it will be obvious to those skilled in the art that any form of feeding mechanism for dispensing articles in charges of predetermined quantities may well be employed in conjunction with the present invention.

The apparatus includes a base plate 1 to the opposite ends of which are secured vertical posts 2. These posts extend the full height of the apparatus and serve as supporting members or masts between which to carry the operating mechanism. The upper ends of the posts are connected by a tie member 3 which is held in place by bolts 4 and forms a rigid supporting frame with the base and posts.

As seen in Fig. 3 the bin A is arranged in a tank 5 which holds a body of liquid 6, the tank being suitably supported by brackets 7 secured to the posts 2 for supporting the tank above the base. The liquid 6 also flows into the bin A through ports or openings 8 formed in the submersed walls of the bin A. At the start of operations the hopper A is filled to a desired level with a promiscuous mass of cherry pieces in the liquid, sufficient liquid being present to cover the cherry mass and to preferably separate the individual pieces and render them buoyant.

The article discharging mechanism B includes a series of article displacement tubes 9 slidably mounted for vertical movement in suitable bearing bushings 10 formed in parallel rows in the bottom of the bin A. At the upper ends of the tubes there are perforated seats 11 for the cherry pieces. The tubes 9 are held at their lower ends by a carrying plate 12 which ties all the tubes into a single acting member.

The carrying plate 12 is supported on lift brackets 13 which are secured to the lower ends of vertical lift rods 14 (Fig. 3). These rods are located on the transverse center line of the group of tubes and between the respective adjacent side walls of the tank and hopper. The rods 14 are supported for slidable movement in brackets 15 secured to the vertical posts 2 by set screws 16.

Also slidably mounted in the brackets 15 are cam rods 17 each having its upper end connected with the upper end of the respective and adjacent lift rod 14 by a block 18. The lower ends of the cam rods 17 are connected to slotted guide bars 19 the slot formations 20 of which fit over a horizontal drive shaft 21 for guidance thereby (see Fig. 2). The drive shaft 21 is rotatably journaled in right and left bearing blocks 22 secured to the posts 2 and is further journaled in a central pillow block 23 supported on the base 1.

The guide bars 19 carry rollers 24 which extend into a cam race 25 formed in lift cams 26 fixed to the shaft 21. Each cam rod 17 has a compression spring 27 arranged thereon and bottomed on the tank supporting bracket 7, the upper ends of the springs bearing against collars 28 fixed to the cam rods 17 whereby to counterbalance the load of the tubes and carrying plates on the lift cams 26. The lift cams are driven by the drive shaft 21 which forms a part of the drive mechanism D which includes an electric motor 29 having a built-in reduction gear and a drive pinion 30 (Fig. 1) which meshes with a gear 31 fixed to the drive shaft 21.

Upon rotation of the drive shaft 21 the carrying plate 12 will be raised and lowered in the tank 5 to lift cherry halves from the liquid 6 to a point of impalement, the tubes 9 being associated with piston members 32 fixed to and extending upwardly from the bottom of the tank 5 whereby to create agitation of the fruit pieces on descent of the tubes and to create a suction upon elevation of the tubes so as to attract and hold fruit pieces on the seat 11 of the tubes as the pieces are raised out of the liquid.

The article discharging mechanism B further includes a pick-up and stripping unit 33 comprising an overhead crane 34 supported at its two ends on brackets 35 in turn supported at the upper ends of the posts 2. Each bracket 35 has a pair of horizontally aligned bosses in each of which is arranged a slide bar 36 on which is suspended a U-shaped bracket 37. Extending across the bin A and supported by the spaced brackets 37 are a number of spaced racks 38 one above each row of tubes 9. Pick-up elements 39 in the form of weighted pins having barbed lower ends are slidably supported in guide tubes 40 depending from the racks 38, there being one such pin above each tube 9 so as to impale the fruit by impact from the elevating tubes.

All of the pick-up pins are simultaneously moved from their fruit impaling position to a discharge station whence the fruit pieces are directed by the article directing means C to a place of use or delivery. This movement is accomplished by rocker arms 41 having U-shaped hubs 42 at their centers pivotally mounted on stud shafts 43 fixed in bearing brackets 44 in turn secured by bolts 45 to brackets 46 adjustably secured to the posts 2 (see Figs. 1 and 2). The lower ends of the rocker arms 41 carry rollers 47 which extend into race ways 48 formed in crane operating cams 49 located at each side of the machine and secured to the drive shaft 21 for rotation therewith.

The upper ends of the rocker arms 41 are formed to provide yokes 50 straddling rollers 51 mounted on studs 52 extending laterally from and carried by stud brackets 53 secured to the outer sides of the U-shaped brackets 37 forming the end supports for the pin carrying racks 38.

Rotation of the drive shaft 21 to lower the tubes 9 will cause movement of the rocker arms 41 clockwise (Fig. 2) to move the racks and pins with the fruit pieces impaled thereon to the position shown in dotted lines in Fig. 3 and incidental to such movement each fruit piece will be stripped from the barb of the pin upon which it is impaled and will drop into the article directing means C.

The means for stripping the fruit pieces from the barbed pins as aforesaid includes a stripper bar 54 complementary to each pin supporting rack 38 and having a plurality of openings 55 to fit the stripper bars over the pins in the respective row of pins on the complementary rack. Each stripper bar has a boss formation 56 at its ends mounted for vertical sliding movement on a stud pin 57 depending from the lower face of the U-shaped brackets 37, there being headed lower ends on the stud pins to limit downward movement of the bosses and stripper bars.

Each boss 56 carries a roller 58 which rides upon fixed cam tracks 59 arranged on the sides of the machine and supported at one end by bolting as at 60 to L-shaped brackets 61 in turn supported by the tank supporting bracket 7 on either side of the machine. The L-shaped brackets 61 are joined at their upper ends by a tie bar 62 to form a stripper cam supporting frame which in turn supports the article directing means C.

The cam tracks 59 have a horizontal portion 63 which supports the rollers and stripper bars in an elevated or ineffective position when the racks and pins are in fruit impaling position above the tubes 9 and a downwardly sloping portion 64 which allows the respective stripper bars to descend as the crane is moved toward fruit discharging position whereby the separate rows of fruit pieces are stripped from their respective pins as they pass over the article directing means C.

The article directing means C comprises hoppers 65 arranged in a bank, as shown in Figs. 1 and 2, along the rear side of the machine and are secured as by bolts 66 to the tie bars 62 of the stripper cam supporting frame. In the exemplified embodiment a separate hopper is provided for each transverse row of pick-up pins as seen in Fig. 1. Each hopper is open at the top and bottom and tapers, as shown in Fig. 3, from the upper end to the lower end thereof.

The inner surface 67 of the hopper is of a roughened character, being pebbley-like or furnished with a multiplicity of small bumps in a nature of a hammered surface. This is an important feature in connection with handling cherry halves as it prevents cherry halves dropping from the pick-up pins, upon being stripped therefrom, from sticking to the surface of the hopper by the suction effect of their cupped portion. If the surface 67 were smooth, half cherries could readily stick to it and not be discharged.

Connected to the lower end of the hoppers 65 are straight discharge spouts or delivery tubes or chutes 68 which are connected to the hopper by a flexible or resilient sleeve 69, for instance of rubber, held to the tubes by the wire tie members 70. Thus the delivery tubes are flexible in nature and it will be observed from Fig. 1 that these discharge or delivery tubes may be grouped together in order to deliver the cherry pieces from more than one transverse row of pick-up pins to a single delivery point, for example a container, held below the grouped discharge tubes. The tubes may be held in grouped relationship by tie backs or clasps 71 (see Fig. 1) which are slidably adjustable on a bar 72 held by screws 73 to the L-shaped brackets 61.

As shown in Fig. 1, all but the delivery tube at the extreme right are grouped in pairs, the right hand group of transverse pick-up pins being rendered inoperative by latching the pins in elevated position as seen in the case of the right hand pins in Figs. 1 and 3. It will be understood, however, that more than two of these tubes may be grouped together at one point, and that various combinations may be obtained in order to deliver the same or different counts of cherry pieces to succeeding containers moved with respect to the discharge tubes.

The container feed mechanism is provided for continuously bringing containers into position with respect to the article directing means C and controlling the movement of one or more containers at a position relative to the discharge tubes 68 beneath which they are held for an interval of time sufficient to receive their charge of fruit and removing the containers after they have received a charge of fruit pieces.

The controlled movement of the containers is coordinated with the article discharge mechanism so that one or a battery of containers, as the case may be, are in position to receive a charge of cherry pieces when the pick-up mechanism is discharging the same.

Referring now more particularly to the disclosure in the drawings which illustrate the container delivery and control mechanism, the containers are carried by a continuously moving means F in the form of a belt 74 in the direction of the arrows Figs. 1, 4, 5, and 6. The belt is continuously driven from a drive pulley, not shown, the upper run of the belt passing over an idler pulley 75, Fig. 1, to a plate or apron 76 having integral supporting arms 77 (Figs. 1 to 3). These arms are secured as by bolts 78 to brackets 79 adjustably secured by set screws 80 to the posts 2 at each end of the machine.

The belt 74 passes, as shown in Fig. 1, from the plate 76 over a further pulley 81 from which it returns to the drive pulley by passing below the plate 76. From the belt 74, the containers are transferred, as shown in Fig. 1, over a stationary plate 82 to another moving belt 83 carried by pulleys 84 for further operation. The pulleys 75, 81 and 84 are fixed to shafts 85 which are rotatably journaled in the bearing brackets 86, supported by means not shown. A catch plate 87 is positioned below the lower run of the belt 74 to protect operators therefrom and to provide a spill table for fruit pieces. The catch plate is supported by the brackets 88 to which it is held as by riveting. The brackets 88 are in turn secured to the container guide mechanism to be presently described.

In order to direct the containers to their proper position below the discharge tubes 68, a guide channel E is provided extending substantially centrally of the belt 74. The channel is formed by outer and inner guide rails, one of which is positioned adjacent to each edge of the upper run of the belt 74. Each guide rail consists as shown in Fig. 3 of the upper guide bar 89 and the lower guide bar 90, secured as by welding to the end brackets 91 which are secured to the plate supporting arms 77 as by bolt 92.

The container guides are adjustable toward and away from each other to permit the guide channel to accommodate and centralize different sized containers. For this purpose, slots 93, Fig. 2, are provided in the plate supports 77, with the slots of sufficient length to accommodate an adjustment for the various sized cans to be used with the machine. To assist the operator in making rapid settings during a day's run when a change is to be made in the size of the containers to be fed by the belt, the slots are suitably indexed with numerals corresponding to the different sized cans and a zero marking provided on the foot of the brackets 91. In addition, a table of can sizes and settings is provided at some point on the mechanism, for instance the tank 5, where it may be readily observed by the operator, or referred to in making changes.

The stop mechanism in the form of a container engaging means G is provided to retard movement of the containers past the discharge tubes 68 and comprises, as shown in Figs. 4 to 6 inclusive, a feed stop unit 94 to control movement of containers from the feed line to cherry receiving position and a similar discharge stop unit 95 to control discharge of filled containers, located immediately behind the container feed channel. Each stop unit comprises, as shown in Figs. 1 and 3, a stop arm slide frame 96 which is secured to the under face of a supporting bracket 97 by bolt 98. The bracket is adjustably mounted upon the nearest post 2 by a set screw 99.

The slide frame 96 is of U-shape (see Fig. 3) and is located in inverted position so that the sides thereof point downwardly and provide bearings for slidably fitted parallel reciprocating rods 100 and 101, which operate in these portions of the frame. Moreover, the frame is so located that the rods operate from front to rear of the machine. Furthermore, the rods carry a connecting block 102 which is fixed to the adjacent ends of these rods at the rear side of the machine. Fixed to each block 102 and projecting horizontally and at right angles with respect to the rods 100 and 101 is a stop bar 103 which is adjustably slidable on the block and is locked therein by a set screw 104.

As shown in Figs. 4 to 6, a stop finger 105 is connected to the end of the stop bar of the feed stop unit 94, and at right angles thereto to project in a horizontal position, in the direction of the container feed channel. A similar stop finger 106 is connected to the discharge stop unit 95 and is similarly positioned. It will be observed from Figs. 4 to 6 that the stop fingers are located between the two stop units but it will be understood that this positioning is optional and that the stop fingers may be located on the same or different sides of the stop units as desired.

The stop fingers 105 and 106 are reciprocated in and out of the container channel through the slide rods previously mentioned and the slide mechanism is driven through a laterally projecting pin 107 which is fixed to the lower slide rod 101 between the bearings of the frame 96. The pin terminates in a collar portion and is held to the slide rod by the set screw 108, as shown in Fig. 4.

Motion is imparted to each slide mechanism by control mechanism G including levers 109 (Figs. 1 and 3) each having its fulcrum in a bracket 110, secured by bolts 111 to the base 1. The levers are pivotally mounted in the brackets 110 by means of pins 112 which are rigidly secured in the levers. The upper ends of the levers are fork-shaped (see Fig. 3) and fit over the operating pins 107 of the slide mechanism. The levers 109 are rocked by cams 113 located on each side of the machine, through cam rollers 114 which engage an endless camway 115 formed in the cams 113, and are secured to the levers substantially midway their length by studs 116. The cams are fixed to the main drive shaft 21 and rotate therewith.

As previously indicated, the two stop units are of the same character. However, the cam of one is set slightly ahead of the other in order that the action depicted in Figs. 4, 5, and 6 may be obtained. Thus, the cams are set so that the stop finger 105 (Fig. 4) moves into the container channel to stop motion of containers moving in from the feed line. In the meantime the stop finger 106 is moved out of the container channel and permits any containers that were previously held between the stops to pass by. After the containers have passed out of the space between the two stop fingers, stop finger 106 (Fig. 5) again moves into the container channel. When this occurs, stop finger 105 is moved out of the channel and containers X, as shown in Fig. 5, are permitted to move past it up to the stop finger 106. When the containers have come to rest, stop finger 105 is again moved into the container channel and the positioning of the stops and containers is then as shown in Fig. 6, which shows a bank of containers X held between the two stop fingers and stop finger 105 acting to hold back containers Y of the feed line. When the containers X are ready for discharge, stop finger 106 is again moved out of position to permit the containers X between the stop fingers to move on to the discharge position.

It will be observed from Figs. 4 to 6 inclusive, that the stop fingers 105 and 106 of the stop units 94 and 95, respectively, are laterally adjustable by moving the stop finger bars 103 in the blocks 102. In this manner the distance between the stop fingers 105 and 106 may be adjusted to accommodate any predetermined number of cans within the range of adjustment. Thus for example, as shown in Fig. 6, the stop fingers are set to receive a bank of five containers. However, by moving the stop finger bars 103 laterally the number of containers between the stop fingers can manifestly be increased, for example, to nine. It is merely necessary to provide sufficient length to the stop finger bars to set the range to anything from one container upward. A further feature of the stop finger mechanism is the ease with which the stop mechanism may be disconnected from the container feed line in case of the need. It is merely necessary to loosen the set screw 104 holding the stop finger bars and flip the stop fingers over and out of the container feed channel and the containers may then be continuously fed by the belt past the machine. This feature is quite helpful where the containers are being fed past a series of machines.

Operation

In the foregoing description of the construction of the container feeding mechanism the operation of the various parts thereof has been explained. For a more complete understanding a résumé of the entire cycle of operation of the mechanism will now be given setting forth the function of the various units in proper sequence and timed relation.

Assuming a mass of fruit pieces has been placed in the bin A together with a body of liquid brought to the desired level and that power is now imparted to the belt 74 of the container moving means and the motor 29 which through gears 30 and 31 rotate the drive shaft 21 and the cams 26, 49 and 113 carried thereby. Also assuming that the mechanism is in the position illustrated in Fig. 3 the displacement tubes 9 on carrying plate 12 through cam 26, cam rods 17 and lift rods 14 descend and the pressure created by the fixed pistons 32 escapes through the perforated seats 11 thus stirring up and agitating the fruit pieces in the liquid body within the bin A to buoyantly suspend the fruit pieces in the liquid.

As the cam 26 is raised the displacement tubes 9 are elevated, thus creating a suction at the perforated seats 11 to attract fruit pieces onto the seats for elevation thereby. The pin carrying racks 38 are now in position above the bin A and the fruit pieces elevated by the tubes 9 are impaled upon the barbed ends of the pins 39 by impact (see Fig. 3).

As the displacement tubes again descend for reception of another charge of fruit pieces, the overhead crane 34 is moved to the right by rocker arms 41 through the crane operating cams 49, the stripper bars 54 descending successively as the rollers 58 ride down the sloped portions 64 of the cam tracks 59 thus stripping the fruit pieces from the barbed pins into the respective hoppers 65. As shown in Fig. 1 the charges from two transverse rows of pins are directed to a single point of use or delivery above the container feed mechanism, it being understood that the charges may be varied in quantity by rearrangement of the discharge spouts 68.

Containers are being fed from a feed line in a continuous stream along the guide channel E by the continuously moving means F to pass the containers beneath the discharge ends of the grouped discharge spouts. The cams 113 on drive shaft 21 through rollers 114 rock the levers 109 thus synchronizing the container engaging means G with the operation of the article discharging means B.

While the tubes 9 are elevated and the overhead crane 34 is returned to fruit impaling position, the discharge stop finger 106 of the container feed mechanism is withdrawn from the guide channel to permit any containers (X) held thereby to pass on as shown in Fig. 4, subsequent containers (Y) approaching position under the discharge spout along the feed line being meanwhile held up by the stop finger 105.

When a sufficient time has elapsed for any containers between the two stops to clear the discharge stop finger 106, it again starts moving in, as in Fig. 5, and as this occurs the stop finger 105 moves out, as also shown in this figure, and permits a new supply of containers to move into position and approach the stop 106. Such movement is designated by the containers marked X in Fig. 5. By the time the leading container X reaches the stop finger 106, stop finger 105 begins to move in to hold the containers marked X between the two stop fingers.

The containers X are positioned as shown in Fig. 6 when the charges of fruit are stripped from the barbed pins and the fruit pieces are directed by the discharge spouts into the respective containers.

When the pins have all discharged their respective cherry pieces the overhead crane again returns to the pick-up position above the displacement tubes 9 and the discharge stop 106 again functions to release the containers that have just been filled. This condition is depicted in Fig. 5 where the containers X are shown moving beyond the discharge stop 106. While this occurs the remaining containers in the feed line are held back by the stop 105. When the cans X have cleared the stop 106 the stop 105 functions as described previously to permit a new bank of containers to move into position to receive their charges of fruit by the foregoing operations.

From a consideration of the foregoing it will be seen that I have provided a novel apparatus for feeding containers and for controlling the movement of the containers incident to the reception of charges of articles thereby.

While I have described a specific embodiment of my invention it will be understood by those skilled in the art to which the invention appertains that various modifications, changes and substitutions may be made in the invention without departing from the spirit thereof.

What I claim as new and desire to protect by Letters Patent is:

1. A container feed mechanism comprising a container guide channel having a continuously moving surface for moving containers, a first container stop, a second container stop spaced from said first stop, means for adjusting the distance between said stops to accommodate a predetermined number of containers for receiving a charge of material, means for reciprocating said stops in and out of said channel, means for controlling reciprocation of said stops for positioning both stops in said channel while containers are receiving charges of material, for moving said first stop out of said channel when containers have received their charges, for moving said second stop out of said channel when the charged containers have substantially cleared said first stop and for again moving said first stop into said channel before the leading container of the subsequent containers for receiving charges of material has reached said first stop.

2. A container feed mechanism comprising a container guide channel having a continuously moving surface for moving containers, a first container stop, a second container stop spaced from said first stop, means for adjusting the distance between said stops to accommodate a predetermined number of containers for receiving a charge of material, means for effecting movement of said stops into and out of said channel and for positioning both stops in said channel while the containers therebetween are receiving a charge of material, for moving said first stop out of said channel after said containers have received their charges of material, for moving said second stop out of said channel when the charged containers have substantially cleared said first stop, and for again moving said first stop into said channel before the leading container of the subsequent containers for receiving charges of material has reached said first stop.

BURTON C. COONS.

REFERENCES CITED

The following references are of record in the file of this patent:

UNITED STATES PATENTS

| Number | Name | Date |
|---|---|---|
| 726,565 | Peters | Apr. 28, 1903 |
| 862,923 | Linsley | Aug. 13, 1907 |
| 1,137,227 | Martin | Apr. 27, 1915 |
| 1,751,487 | McIntyre | Mar. 25, 1930 |
| 1,752,540 | Olson | Apr. 1, 1930 |
| 1,845,051 | Latham | Feb. 16, 1932 |
| 1,887,751 | Colver | Nov. 15, 1932 |
| 2,050,547 | Thayer | Aug. 11, 1936 |
| 2,286,523 | Whitehead | June 16, 1942 |
| 2,341,705 | Fedorchak et al. | Feb. 15, 1944 |